US00RE45342E

(19) United States
(12) Reissued Patent
Haacke et al.

(10) Patent Number: US RE45,342 E
(45) Date of Reissued Patent: Jan. 20, 2015

(54) LOW POWER DISCHARGE LAMP WITH HIGH EFFICACY

(71) Applicant: Koninklijke Philips N.V., Eindoven (NL)

(72) Inventors: Michael Haacke, Aachen (DE); Martin Stroesser, Aachen (DE)

(73) Assignee: Koninklijke Philips N.V., Eindhoven (NL)

(21) Appl. No.: 14/026,505

(22) Filed: Sep. 13, 2013

Related U.S. Patent Documents

Reissue of:
(64) Patent No.: 8,030,847
Issued: Oct. 4, 2011
Appl. No.: 12/530,537
PCT Filed: Mar. 7, 2008
PCT No.: PCT/IB2008/050832
§ 371 (c)(1),
(2), (4) Date: Sep. 9, 2009
PCT Pub. No.: WO2008/110967
PCT Pub. Date: Sep. 18, 2008

(30) Foreign Application Priority Data

Mar. 12, 2007 (EP) ..... 07103946

(51) Int. Cl.
*H01J 17/16* (2012.01)
*H01J 61/30* (2006.01)

(52) U.S. Cl.
USPC ..... 313/634; 313/493; 313/568; 313/573; 313/641

(58) Field of Classification Search
CPC ..... H01J 61/827; H01J 61/36; H01J 61/18; H01J 61/34; H01J 61/30; H01J 61/33; H01J 61/16; H01J 9/395; H01K 1/14; H01K 1/28; H01K 1/34
USPC ..... 118/50; 313/623–625, 634–636, 493, 313/318.12, 570
See application file for complete search history.

(56) References Cited

U.S. PATENT DOCUMENTS 4,161,672 A 7/1979 Cap et al.
4,594,529 A 6/1986 De Vrijer (Continued)

FOREIGN PATENT DOCUMENTS

DE 10163584 C1 4/2003
EP 0883160 A1 12/1998

(Continued)

OTHER PUBLICATIONS

David R. Lide, Ed: "Thermal Conductivity of Gases"; CRC Handbook of Chemistry and Physics, 88th Edition, vol. 88, 2008, pp. 6-184-6-185.

(Continued)

*Primary Examiner* — Nimeshkumar Patel
*Assistant Examiner* — Jose M Diaz
(74) *Attorney, Agent, or Firm* — Yuliya Mathis

(57) ABSTRACT

In order to achieve a discharge lamp suited to operate under reduced nominal power of e.g. 20-30 W, a lamp is proposed with two electrodes (24) arranged at a distance in a discharge vessel (20, 120) for generating an arc discharge. The discharge vessel (20,120) has a filling with a substantially free of mercury and comprises a metal halide and a rare gas. The lamp (10, 110) further comprises an outer bulb (18) arranged around the discharge vessel at a distance ($d_2$). The outer bulb (18) is sealed and has a gas filling of a thermal conductivity ($\lambda$). The inner diameter ($d_1$) of the discharge vessel is preferably in a range from 2-2.7 mm. The wall thickness ($w_1$) is in a range from 1.4-2 mm. A heat transition coefficient ($\lambda/d_2$) is calculated as thermal conductivity ($\lambda$) at 800° C. of the outer bulb filling divided by the distance ($d_2$). The so-defined heat 10 transition coefficient is below 150 W/($m^2$K).

37 Claims, 7 Drawing Sheets

(56) References Cited

U.S. PATENT DOCUMENTS

| | | | | |
|---|---|---|---|---|
| 4,622,485 | A | 11/1986 | Miyashita et al. | |
| 5,359,255 | A * | 10/1994 | Kawai et al. | 313/17 |
| 5,736,811 | A | 4/1998 | Westemeyer et al. | |
| 6,724,145 | B1 | 4/2004 | Muto et al. | |
| 6,853,140 | B2 | 2/2005 | Lapatovich et al. | |
| 7,098,596 | B2 * | 8/2006 | Takagaki et al. | 313/631 |
| 2003/0117074 | A1 * | 6/2003 | Lapatovich et al. | 313/634 |
| 2005/0134182 | A1 | 6/2005 | Ishigami et al. | |
| 2005/0248278 | A1 | 11/2005 | Wijenberg et al. | |
| 2006/0049764 | A1 | 3/2006 | Bedynek et al. | |
| 2006/0202627 | A1 | 9/2006 | Dudik et al. | |
| 2006/0244384 | A1 * | 11/2006 | Genz et al. | 313/634 |
| 2009/0108756 | A1 * | 4/2009 | Eisemann | 313/639 |

FOREIGN PATENT DOCUMENTS

| | | | |
|---|---|---|---|
| EP | 1037257 | A2 | 9/2000 |
| EP | 10372547 | A2 | 9/2000 |
| EP | 1063681 | A2 | 12/2000 |
| EP | 1150337 | A1 | 10/2001 |
| JP | 05290804 | A | 11/1993 |
| JP | 2006344579 | A | 12/2006 |
| WO | 2008007283 | A2 | 1/2008 |
| WO | 2008007284 | A2 | 1/2008 |

OTHER PUBLICATIONS

Kestin et al: "Equilibrium and Transport Propterties of the Noble Gases and Their Mixtures At Low Density"; Journal of Physical and Chemical Reference Data, vol. 13, No. 1, 1984, pp. 229-303.

Uribe et al: "Thermal Conductivity of Nine Polyatomic Gases At Low Density"; Journal of Physical and Chemical Reference Data, vol. 19, No. 0.5, 1990, pp. 1123-1136.

* cited by examiner

LOW POWER DISCHARGE LAMP WITH HIGH EFFICACY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The invention relates to a discharge lamp. More specifically, the invention relates to a high intensity discharge lamp with a discharge vessel and an outer bulb arranged around the discharge vessel.

BACKGROUND OF THE INVENTION

Discharge lamps, specifically HID (high-intensity discharge) lamps are used for a large area of applications where energy efficiency and high light intensity are required. Especially in the automotive field, HID lamps are used as vehicle headlamps.

A discharge lamp comprises two electrodes arranged at a distance within a discharge vessel. An arc discharge is generated between the electrodes. Different types of fillings within the discharge vessel are known, distinguishing mercury vapor, metal halide and other types of lamps.

Commercially available lamps for use in a vehicle headlight have an outer bulb which is arranged around the discharge vessel at a distance therefrom. A known type of such a lamp is designed for a nominal power of 35 W and achieves a high efficacy of 80-90 lm/W. After starting such a lamp, a run-up current of, for example, 2.7-3.2 A is necessary, and a run-up power of 75-80 W is used. Thus, the complete HID system comprising lamp, ballast and igniter must be able to operate as these values.

Especially for the automotive field, it would be desirable to have a discharge lamp with lower nominal power, e.g. in the range of 20-30 W, and correspondingly lower demands on the complete HID system. If, however, known lamp designs are simply used at lower power, the lamp efficacy will be dramatically reduced.

US-A-2005/0248278 shows an example of an automotive head lighting discharge lamp with a power of 30 W. The lamp has a ceramic discharge vessel comprising the electrodes, which is surrounded by an outer bulb. The distance between the electrode tips is 5 mm. The discharge vessel has cylindrical shape with an internal diameter of 1.2 mm. The wall thickness of the discharge vessel is 0.4 mm. The discharge vessel comprises a filling which is free from mercury and comprises NaPrI and $ZnI_2$ as well as Xe with a filling pressure of 16 bar. The outer bulb is made of quartz glass and is arranged at a distance of 0.5 mm to the discharge vessel. The outer bulb is filled with $N_2$ with a filling pressure of 1.5 bar at room temperature.

It is an object of the invention to provide a relatively low power HID lamp with high lamp efficacy.

This object is achieved by a high intensity discharge lamp according to claim 1. Dependent claims refer to preferred embodiments of the invention.

SUMMARY OF THE INVENTION

The inventors have recognized that in order to maintain high efficacy thermal design of the lamp needs to be adapted to the lower power. The "coldest spot"-temperature needs to be maintained at a high level to achieve good lamp efficacy. However, thermal load on a "hot spot" needs to be constrained in order to achieve good durability. This has led the inventors to propose a lamp with a relatively small discharge vessel, leading to reduced heat radiation, while still maintaining a sufficiently thick wall of the discharge vessel to not only withstand high internal pressure, but specifically to allow heat conduction from the hot upper side ("hot spot") to the colder lower side.

According to the invention, a specific geometry is provided in view of the thermal design of the lamp. The discharge vessel is maintained with a substantial wall thickness of 1.4-2 mm, and preferably also a relatively small inner diameter from 2-2.7 mm.

An outer bulb is arranged around the discharge vessel. The outer bulb is sealed and has a gas filling with a thermal conductivity $\lambda$. The thermal conductivity $\lambda$ of the outer bulb filling is taken at 800° C.

The geometry of the outer bulb (here specifically: the distance $d_2$ between the discharge vessel and the outer bulb) and the gas filling are chosen to achieve a certain, limited heat flow from the discharge vessel to the outside. The thermal conductivity $\lambda$ of the gas filling and the distance $d_2$ are chosen to obtain a desired heat transition coefficient $\lambda/d_2$ calculated as the thermal conductivity $\lambda$ divided by the distance $d_2$. According to the invention, this coefficient is below 150 $W/(m^2K)$. For the purposes of measurement, here, the distance $d_2$ is measured in cross-section of the lamp taken at a central position between the electrodes.

The outer bulb therefore plays an important part in the thermal design of the lamp. While on one hand thermal radiation is limited by the limited size of the discharge vessel, heat conduction in radial direction of the lamp is further limited by the geometry and filling of the outer bulb. As will be explained in relation to the preferred embodiment, the amount of heat transported per time unit between the discharge vessel and the outer bulb, both at their constant operating temperature, is roughly proportional to the defined heat transition coefficient. Thus, by choosing the heat transition coefficient to be below 150 $W/(m^2K)$, cooling is limited, such that sufficient high coldest spot temperatures, and thus high efficacy are maintained. To achieve a desired, high enough coldest spot temperature the heat transition coefficient is preferably equal to or less than 130 $W/(m^2K)$, most preferably even lower <100 $W/(m^2K)$. It is further preferred for the heat transition coefficient to be at least 10 $W/(m^2K)$, further preferred at least 15 $W/(m^2K)$.

A lamp according to the invention is especially suited for a nominal power of 20-30 W. The filling of the discharge vessel is preferably free of mercury and may comprise one or more metal halides and a rare gas. Preferably, the filling of the discharge vessel comprises one or more of the following: NaI, $ScI_3$, $ZnI_2$.

Preferred embodiments of the invention relate to the outer bulb. The outer bulb is preferably made out of quartz glass and may be of any geometry, e.g. cylindrical, generally elliptical or other. It is preferred for the outer bulb to have an outer diameter of at most 10 mm. The outer bulb is sealed and has a gas filling at a pressure of 10 mbar to 1 bar, preferably below 1 bar, most preferably 50 mbar to 300 mbar. The gas filling may essentially consist (i.e. comprise more than 50%, preferably more than 90%) of one or more of the following: Xe, Ar, $N_2$, $O_2$. The distance $d_2$ between the outer bulb and the discharge vessel is preferably 0.1-1.4 mm, most preferably 0.3-0.8 mm. As will be appreciated by the skilled person, the filling gas, pressure and distance $d_2$ may only be chosen dependent on one another to achieve the desired heat transition coefficient.

Other preferred embodiments of the invention relate to the discharge vessel. Preferably, the discharge vessel is made from quartz glass. The distance between the electrodes is preferably 2.5-5.5 mm. Most preferably, the optical distance (i.e. the distance as viewed from the outside, taking into account magnification of the discharge vessel wall acting as a lens) is 4.2±0.6 mm. The discharge vessel has a shape such that in a cross-section taken at the central position between the electrodes the wall of the discharge vessel is at least substantially circular.

In a preferred embodiment, the discharge vessel, when viewed in longitudinal section, has at least substantially elliptical outer shape and may have either elliptical or cylindrical inner shape. In this case, it is preferred for the wall thickness $w_1$ to be in the range from 1.55-1.85 mm.

According to an alternative embodiment, the discharge vessel, when viewed in longitudinal section, has elliptical or cylindrical inner shape and concave outer shape, i.e. starting from the central position between the electrodes the outer diameter of the discharge vessel increases towards both sides. In this case, it is preferred for the wall thickness $w_1$ to be in the range from 1.4-2 mm.

BRIEF DESCRIPTION OF THE DRAWINGS

The above and other objects, features and advantages of the present invention will become apparent from the following description of preferred embodiments, in which.

DETAILED DESCRIPTION OF EMBODIMENTS

All embodiments shown are intended to be used as automotive lamps for vehicle head lights, conforming to ECE R99 and ECE R98. This, specifically, is not intended to exclude lamps for non-automotive use, or lamps according to other regulations. Since such automotive HID lamps are known per se, the following description of the preferred embodiments will primarily focus on the special features of the invention.

Figure 1:
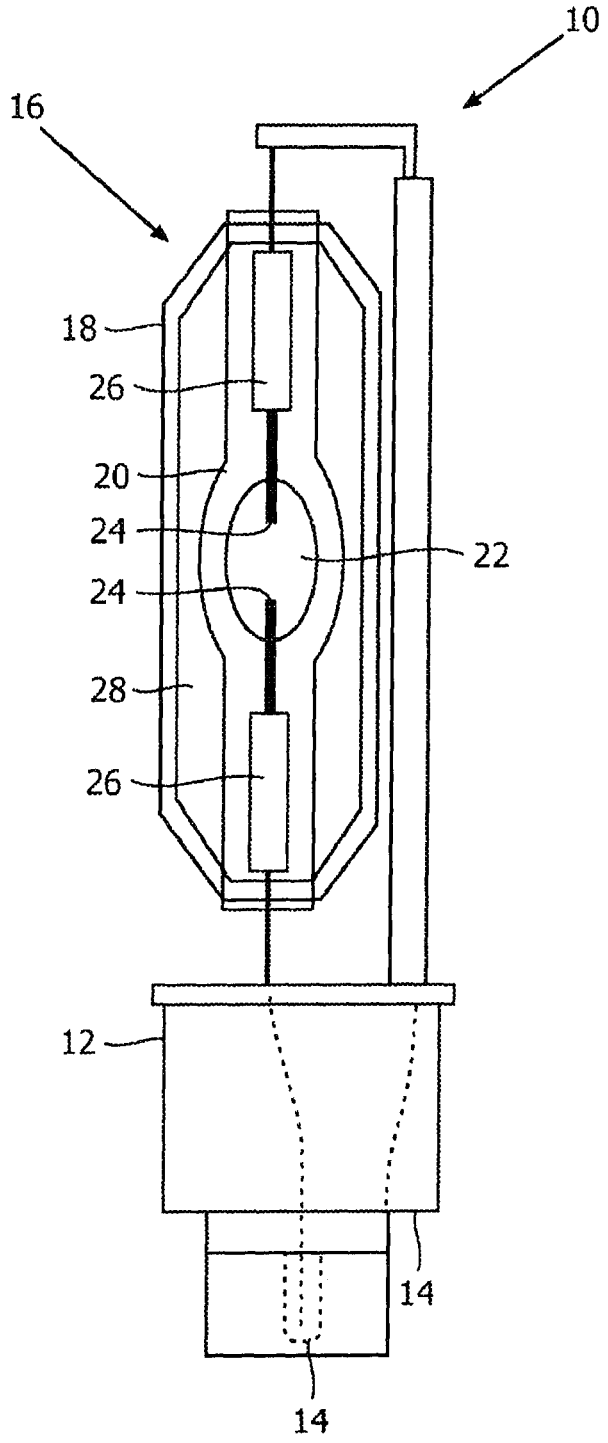
FIG. 1 shows a side view of a lamp according to a first embodiment of the invention.

FIG. 1 shows a side view of a first embodiment 10 of a discharge lamp. The lamp comprises a socket 12 with two electrical contacts 14 which are internally connected to a burner 16.

The burner 16 is comprised of an outer bulb 18 of quartz glass surrounding a discharge vessel 20. The discharge vessel 20 is also made of quartz glass and defines an inner discharge space 22 with projecting electrodes 24. The glass material from the discharge vessel further extends in longitudinal direction of the lamp 10 to seal the electrical connections to the electrodes 24 which comprise a flat molybdenum foil 26.

The outer bulb 18 is arranged around the discharge vessel 20 at a distance, thus defining an outer bulb space 28. The outer bulb space 28 is sealed.

Figure 2:
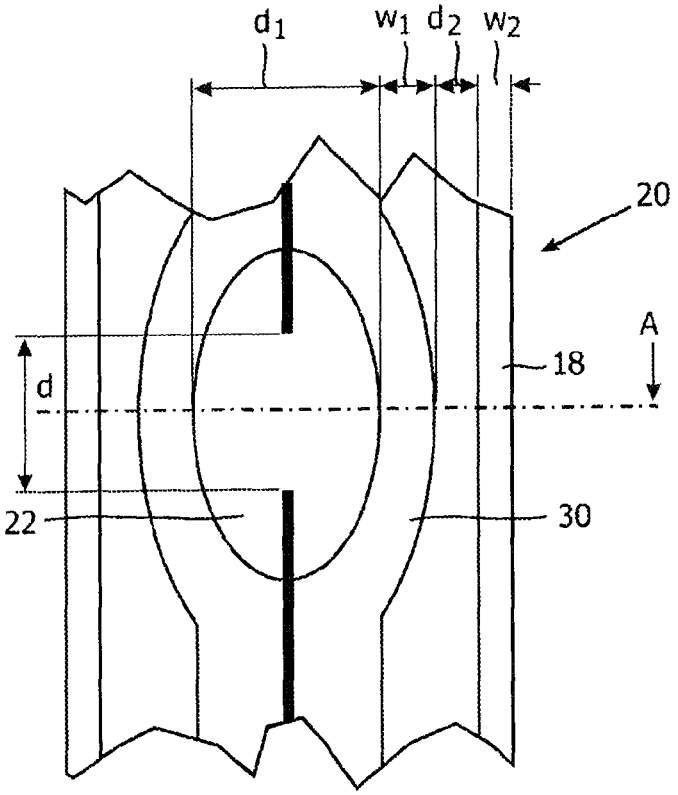
FIG. 2 shows an enlarged view of the central portion of the lamp shown in FIG. 1.

As shown in greater detail in FIG. 2, the discharge vessel 20 has an outer wall 30 arranged around the discharge space 22. The discharge space 22 is of ellipsoid shape. Also, the outer shape of the wall 30 is ellipsoid.

Figure 2A:
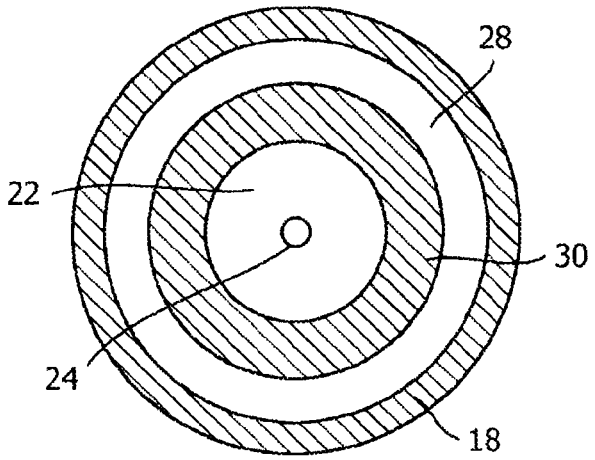
FIG. 2a shows a cross-sectional view along the line A in FIG. 2.

The discharge vessel 20 is characterized by the electrode distance d, the inner diameter $d_1$ of the discharge vessel 20, the wall thickness $w_1$ of the discharge vessel, the distance $d_2$ between the discharge vessel 20 and the outer bulb 18 and the wall thickness $w_2$ of the outer bulb 18. Here, the values $d_1$, $w_1$, $d_2$, $w_2$ are measured in a central perpendicular plane of the discharge vessel 20, as shown in FIG. 2a.

The lamp 10 is operated, as conventional for a discharge lamp, by igniting an arc discharge between the electrodes 24. Light generation is influenced by the filling comprised within the discharge space 22, which is free of mercury and includes metal halides as well as a rare gas.

In the following examples, the filling of the discharge space 22 comprises about 17 bar cold xenon pressure and as metal halides 36 wt % NaI, 24 wt % $ScI_3$ and 40 wt % $ZnI_2$.

In the following, different embodiments of a lamp will be discussed, which are each intended to be used at different (steady-state) levels of operating power. The operating power of the embodiments is within the interval of 25-30 W. For each embodiment, a specific design is chosen with regard to thermal characteristics of the lamp in order to achieve high lamp efficacy.

Regarding the thermal behavior of a discharge lamp 10 as shown, it should be kept in mind that automotive lamps are intended to be operated horizontally. The arc discharge between the electrode 24 will then lead to a hot spot at the wall 30 of the discharge vessel 20 above the arc. Likewise, opposed portions of the wall 30 surrounding the discharge space 22 will remain at comparatively low temperatures (coldest spot).

In order to achieve good efficacy and, as will become apparent later, also achieve favorable run-up behavior, the geometric design of the lamp 10 is chosen according to thermal considerations. The "coldest spot" temperature should be kept high to achieve high efficacy. The thickness of the wall 30 should be small enough to allow a quick run-up with limited run-up current, but should not be too small in order to still achieve good heat conduction from the "hot spot" in order to reduce thermal load. The inner diameter $d_1$ should not be too small in order to reduce excessive thermal load at the "hot spot".

In order to reduce heat transport from the discharge vessel 20 to the outside, and to maintain high temperatures necessary for good efficacy, it is thus preferable to use the outer bulb 18 instead of a significant reduction of the thickness $w_1$ of the wall 30. In contrast to a simple downscaling of the discharge vessel 20 (reduced inner diameter, reduced wall thickness, reduced outer diameter), this has proven to also serve to maintain a good lamp lifetime.

In order to limit cooling from the outside, the outer bulb 18 is sealed and filled with a filling gas of reduced heat conductivity. Especially Argon and Xenon are preferred here, but $O_2$ or $N_2$ could be used as well. The outer bulb filling is provided at reduced pressure (measured in the cold state of the lamp at 20° C.). As will be further explained below, the choice of a suitable filling gas has to be made in connection with the geometric arrangement in order to achieve the desired heat conduction from discharge vessel 20 to outer bulb 18 via a suitable heat transition coefficient $\lambda/d_2$.

In the following table, measurement results of lamp efficacy are shown for a lamp as shown in FIG. 1-2a with an inner diameter $d_1$=2.2 mm, a wall thickness $w_1$ of 1.65 mm (thus an outer diameter of the discharge vessel of 5.5 mm) and a steady-state operating power of 25 W for different outer bulb fillings:

| Outer bulb filling | Efficacy S-type | Coldest spot temperature (outside) |
|---|---|---|
| Air (1 bar) | 67 lm/W | 810° C. |
| Ar (100 mbar) | 79 lm/W | 840° C. |
| Xe (100 mbar) | 86 lm/W | 900° C. |

It is thus clearly visible how the reduced heat conduction to the outside leads to a higher coldest spot temperature, and to a higher lamp efficacy.

The heat conduction to the outside may be roughly characterized by a heat transition coefficient $\lambda/d_2$, which is calculated as the thermal conductivity $\lambda$ of the outer bulb filling divided by the distance $d_2$ between the discharge vessel 20 and the outer bulb 18.

Due to the relatively small distance between the discharge vessel 20 and outer bulb 18, heat conduction between the two is essentially diffusive and will therefore be calculated as $\dot{q}=-\lambda \text{ grad } \Theta$, where $\dot{q}$ is the heat flux density, i.e. the amount of heat transported per time between discharge vessel and outer bulb. $\lambda$ is the thermal conductivity and grad $\Theta$, is the temperature gradient, which here may roughly be calculated as the temperature difference between discharge vessel and outer bulb, divided by the distance:

$$\text{grad}\vartheta = \frac{T_{dischargeVessel} - T_{outerBulb}}{d_2}.$$

Thus, cooling is proportional to $$\frac{\lambda}{d_2}.$$

Figure 7:
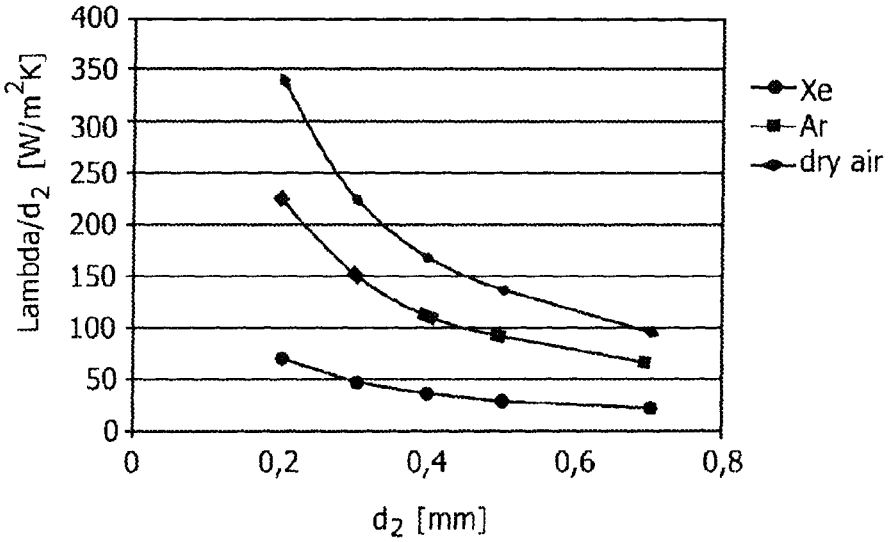
FIG. 7 shows a graph representing a heat transition coefficient $\lambda/d_2$ for different fillings and distances $d_2$.

FIG. 7 shows the dependence of the heat transition coefficient $\lambda/d_2$ on the distance $d_2$ for different outer bulb fillings. It is clearly visible how Argon, and especially Xenon (provided here at a reduced pressure of 200 mbar) have significantly lower heat conductivity than air, and that the heat transition coefficient $\lambda/d_2$ is further reduced with increasing distance $d_2$. The heat transition coefficient was found to differ more strongly with the gas composition, and less with the pressure, if it is in the range from about 10 mbar to about 1 bar.

The following examples of lamps with a rated power of 25-30 W are proposed:

Example 1

| 25 W lamp | |
|---|---|
| discharge vessel: | ellipsoid inner and outer shape |
| electrode distance d = | 4.2 mm optical |
| inner diameter $d_1$ = | 2.2 mm |
| wall thickness $w_1$ = | 1.65 mm |
| outer diameter = | 5.5 mm |
| outer bulb distance $d_2$ = | 0.6 mm |
| outer bulb filling = | Xe 100 mbar ( $\lambda$ = 0.014 W/(m*K) at 800° C.) |
| heat transition coefficient $\lambda/d_2$ = | 23.3 W/($m^2$K) at 800° C. |
| outer bulb wall thickness $w_2$ = | 1 mm |

Example 2

| 30 W lamp | |
|---|---|
| discharge vessel: | ellipsoid inner and outer shape |
| electrode distance d = | 4.2 mm optical |
| inner diameter $d_1$ = | 2.3 mm |
| wall thickness $w_1$ = | 1.75 mm |
| outer diameter = | 5.8 mm |
| outer bulb distance $d_2$ = | 0.45 mm |
| outer bulb filling = | Xe 100 mbar ( $\lambda$ = 0.014 W/(m*K) at 800° C.) |
| heat transition coefficient $\lambda/d_2$ = | 31.1 W/($m^2$K) at 800° C. |
| outer bulb wall thickness $w_2$ = | 1 mm |

Figure 3:
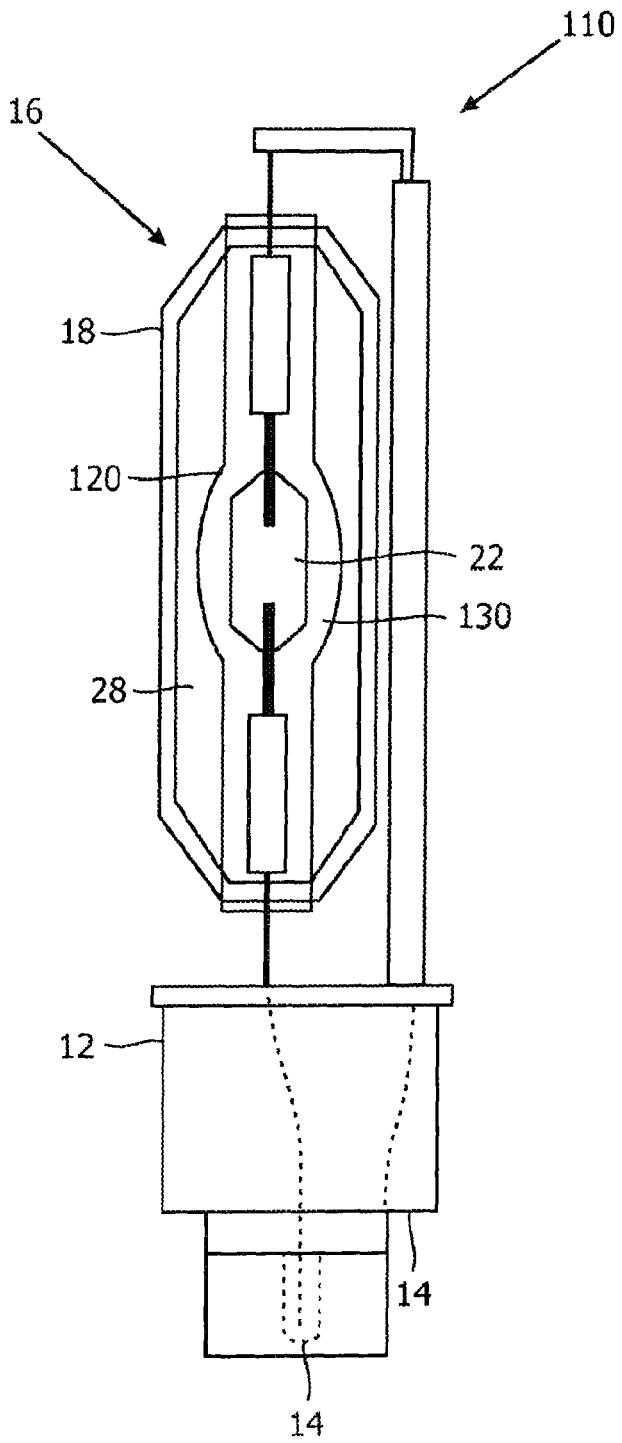
FIG. 3 shows a side view of a lamp according to a second embodiment of the invention.

FIG. 3 shows a second embodiment of the invention. A lamp 110 according to the second embodiment comprises a discharge vessel 120 of different internal shape. The remaining parts of the lamp correspond to the lamp 10 according to the first embodiment. Like elements will be designated by like reference numerals, and will not be further described in detail.

The discharge vessel 120 of the lamp 110 has external ellipsoid shape, identical to the discharge vessel 20 according to the first embodiment. However, the internal discharge space 22 is cylindrical. Both the length and diameter of the inner discharge space 22 however are as in the above first embodiment. It should be noted that the term "cylindrical" used here refers to the central, largest part of the discharge space 22 and does not exclude—as shown—conical end portions.

The wall 130 surrounding the discharge space 22 is consequently of varying thickness, with the thickness being greatest at a position corresponding to the center between the electrodes 24, and decreasing towards both sides.

In the following, a third embodiment of the invention will be described with reference to FIGS. 3-4a. A lamp 110 according to the second embodiment again in large parts corresponds to the lamp 10 according to the above first and second embodiments. Like elements will be designated by like reference numerals and will not be further described in detail.

The lamp 210 differs from the lamp 10 by the concave outer shape of the discharge vessel 120. The inner discharge space 22 remains roughly ellipsoidal as in the first embodiment.

However, the wall 230 surrounding the discharge space 22 has a varying wall thickness such that its outer shape is concave.

Again, geometrical parameters $d_1$, $w_1$, $d_2$, $w_2$ are measured in a central plane of the discharge vessel 220.

Figure 4:
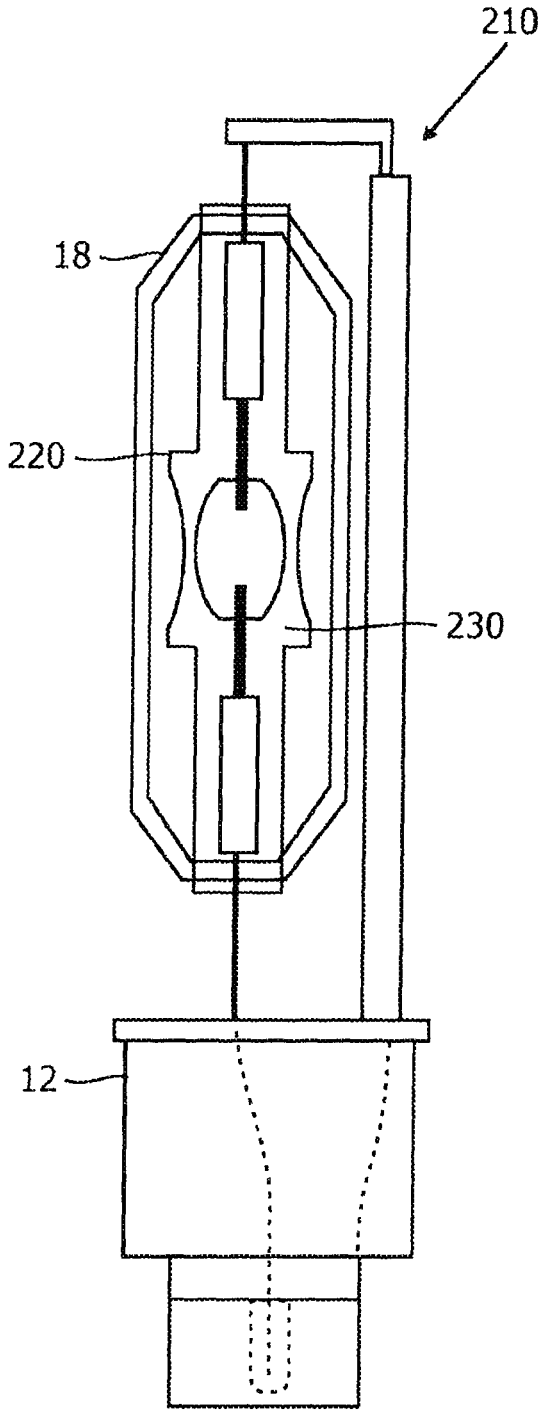
FIG. 4 shows a side view of a lamp according to a third embodiment of the invention.
Figure 5:
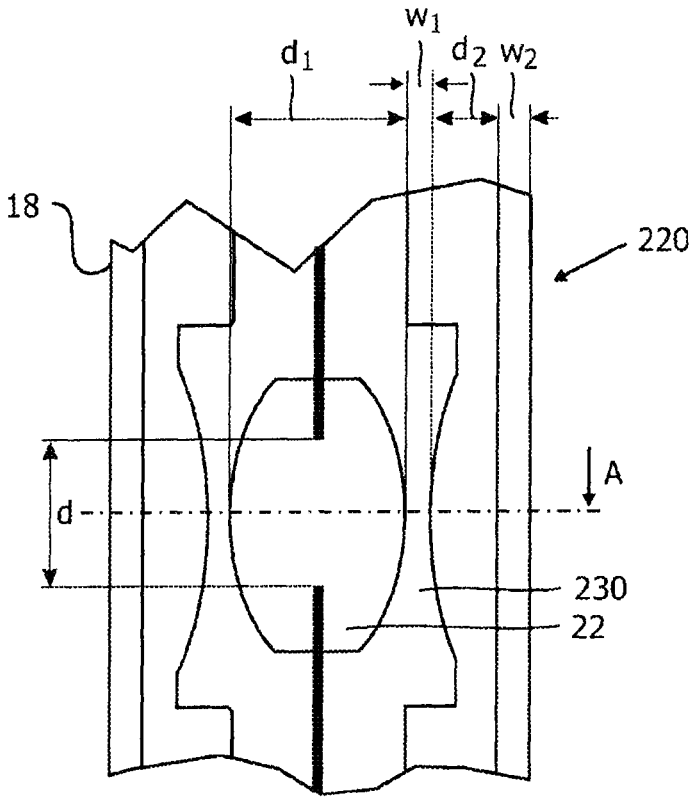
FIG. 5 shows an enlarged view of the central portion of the lamp shown in FIG. 4.
Figure 5A:
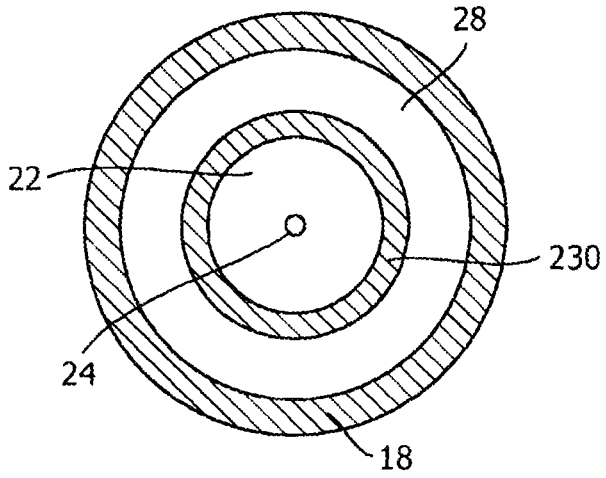
FIG. 5a shows a cross-sectional view along the line A in FIG. 5.
Figure 6:
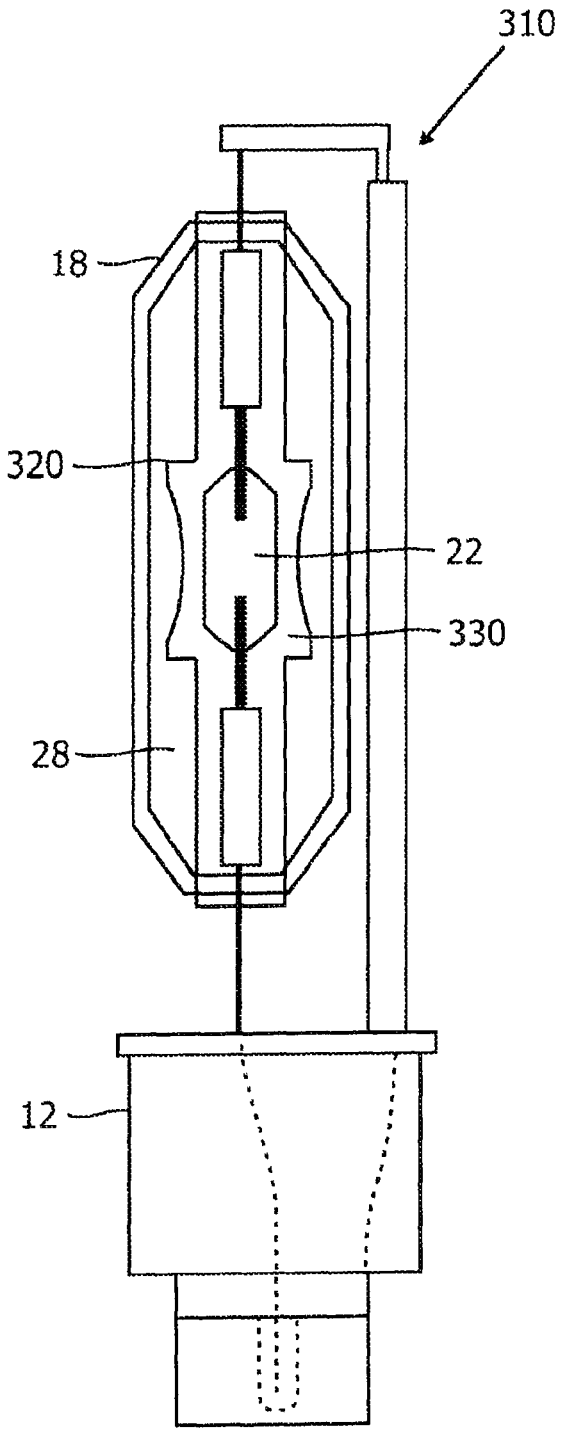
FIG. 6 shows a side view of a lamp according to a fourth embodiment of the invention.

FIG. 6 shows a fourth embodiment of the invention, which in large parts corresponds to the third embodiment according to FIG. 4-5a. Again, like elements are designated by like reference numerals and will not be further described in detail.

According to the fourth embodiment of the invention, a lamp 310 has a discharge vessel 320 with a concave outer shape, but an inner discharge space 22 of cylindrical shape.

Both in the third and forth embodiment, the thickness of the wall 230, 330 surrounding the discharge space 22 varies such that it is minimal in a position corresponding to the center between the electrodes 24 and increases towards both sides. This leads to a lens effect, such that the electrode distance d will appear to the outside smaller than it actually is. Thus, to achieve the desired optical electrode distanced of 4.2 mm, the real electrode distance may be, e.g. 4.8 mm in the third and in the forth embodiment. The possibility to thus increase the real electrode distance d but maintain the optical distance gives to the lamp designer a further degree of freedom. Since the operating voltage increases with the electrode distance, it is possible to obtain a higher voltage.

This may be used to provide a lamp which is compatible with ECE R99 geometrically (optical distance 4.2 mm), but—as a mercury-free-lamp—fulfills the electric requirements of a D2 lamp (voltage more than 68 V).

On the other hand, for the first and second embodiment (elliptical outer shape), it is also possible to provide a larger electrode distance to obtain a lamp, which is not according to ECE R99, but may be operated with higher voltage.

The following examples of lamps according to the third embodiment in a range of 25-30 W are proposed:

Example 3

| 25 W lamp | |
|---|---|
| discharge vessel: | concave outer shape, ellipitical inner shape |
| electrode distance d = | 4.2 mm optical |
| inner diameter $d_1$ = | 2.2 mm |
| wall thickness $w_1$ = | 1.5 mm |
| outer diameter = | 5.2 mm |
| outer bulb distance $d_2$ = | 0.75 mm |
| outer bulb filling = | Ar 100 mbar ( $\lambda$ = 0.045 W/(m*K) at 800° C.) |
| heat transition coefficient $\lambda/d_2$ = | 60 W/($m^2$K) at 800° C. |
| outer bulb wall thickness $w_2$ = | 1 mm |

Example 4

| 28 W lamp | |
|---|---|
| discharge vessel: | concave outer shape, elliptical inner shape |
| electrode distance d = | 4.2 mm optical |
| inner diameter $d_1$ = | 2.2 mm |
| wall thickness $w_1$ = | 1.7 mm |
| outer diameter = | 5.6 mm |
| outer bulb distance $d_2$ = | 0.55 mm |

-continued

| 28 W lamp | |
|---|---|
| outer bulb filling = | 50% Ar/50% Xe 100 mbar ( $\lambda$ = 0.045 W/(m*K) at 800° C.) |
| heat transition coefficient $\lambda/d_2$ = | 45.5 W/($m^2$K) at 800° C. |
| outer bulb wall thickness $w_2$ = | 1 mm |

Example 5

| 30 W lamp | |
|---|---|
| discharge vessel: | concave outer shape, elliptical inner shape |
| electrode distance d = | 4.2 mm optical |
| inner diameter $d_1$ = | 2.2 mm |
| wall thickness $w_1$ = | 1.9 mm |
| outer diameter = | 6.0 mm |
| outer bulb distance $d_2$ = | 0.35 mm |
| outer bulb filling = | 50% Ar/50% Xe 100 mbar ( $\lambda$ = 0.025 W/(m*K) at 800° C.) |
| heat transition coefficient $\lambda/d_2$ = | 71.4 W/($m^2$K) at 800° C. |
| outer bulb wall thickness $w_2$ = | 1 mm |

In the above examples, only discharge vessels of elliptical inner shape were used. However, the same measurements may be used for cylindrical inner shape.

Figure 8:
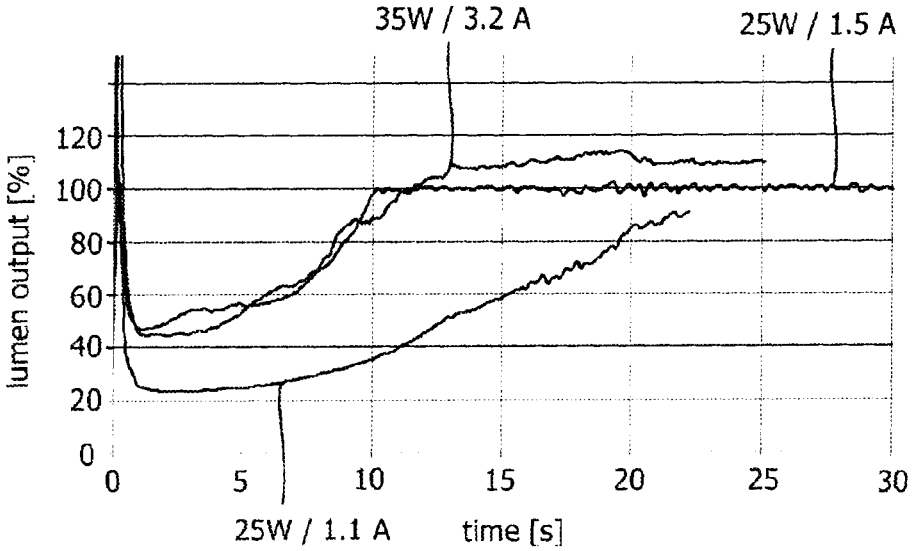
FIG. 8 shows a graph representing measured values of lumen output over time (run-up) for a lamp according to the invention.

FIG. 8 shows measurement results of run-up tests, where a 25 W lamp according to the above example 1 was compared to a reference lamp (35 W lamp). The lumen output was measured and is shown in FIG. 8 over the time since ignition of the lamp. As is known for starting the lamps, in a first phase, the current is limited to a maximum value, and in a second phase, the power is controlled.

As shown in FIG. 8, the reference lamp reaches about 50% of the total lumen output after 4 seconds. But this requires a maximum run-up current of 3.2 A, resp. a maximum power of around 75 W. The 25 W lamp according to example 1 was first driven with a current limitation in the first phase of 1.1 A. Here, the results (less then 30% after 4 seconds) were not satisfactory. However, with a run-up current limitation of 1.5 A (maximum power about 50 W), the lamp according to example 1 shows a quite comparable behavior to the reference, whereas the run-up current is less then half and the maximum run-up power is reduced by about 30%.

The remaining examples where found to also show satisfactory behavior with a run-up current significantly lower then necessary for the reference lamp. This is due to the fact that the smaller discharge vessel is heated up quickly by the arc discharge.

As lifetime tests have shown, the lifetime performance within the first 1500 hours of operation for lamps according to the above embodiments corresponds to the reference (a 35 W lamp).

Thus, it has been shown that the above embodiments provide lamps with good lifetime, good efficacy and good run-up behavior, which all correspond to the reference lamps, but at lower required run-up current and lower steady-state power.

The invention has been illustrated and described in detail in the drawings and foregoing description. Such illustration and description are to be considered illustrative or exemplary and not restrictive; the invention is not limited to the disclosed embodiments.

In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A high intensity discharge lamp, comprising:

a discharge vessel defining a discharge space being essentially free of mercury and containing at least a metal halide and a rare gas;

two electrodes disposed within the discharge vessel for generating an arc discharge a wall forming the discharge space disposed between the electrodes, the wall having substantially circular cross-section with an inner diameter ($d_1$) and a wall thickness ($w_1$), and an outer bulb surrounding the discharge vessel and disposed at a distance ($d_2$) from a central position of an outer surface of the discharge vessel between the electrodes, the outer bulb being sealed and containing a gas filling having a predetermined thermal conductivity ($\lambda$) at 800° C., wherein the wall thickness ($w_1$) ranges from about 1.4 mm to about 2 mm, the distance (d2) ranges from about 0.3 mm to about 0.8 mm, and a heat transition coefficient ($\lambda/d_2$) calculated as said thermal conductivity ($\lambda$) divided by said distance ($d_2$) ranges from about 10 W/($m^2$K) to about 100 W/($m^2$K).

2. Lamp according to claim 1, wherein said inner diameter ($d_1$) ranges from about 2 mm to about 2.7 mm.

3. Lamp according to claim 1, wherein the gas filing consists essentially of Xe, Ar, $N_2$, or $O_2$.

4. Lamp according to claim 1, wherein the gas filling has a pressure of 10 mbar to 1 bar.

5. Lamp according to claim 1, wherein the gas filling has a lower thermal conductivity at 800° C. than air.

6. Lamp according to claim 1, wherein the wall thickness ($w_1$) ranges from about 1.55 mm to about 1.85 mm.

*7. Lamp according to claim 1, wherein said lamp has a nominal power 20-30 W.*

*8. Lamp according to claim 1, wherein said discharge vessel is made of quartz glass.*

*9. Lamp according to claim 1, wherein said outer bulb is made of quartz glass.*

*10. A high intensity discharge lamp, comprising:*

*a discharge vessel defining a discharge space being essentially free of mercury and containing at least a metal halide and a rare gas;*

*two electrodes disposed within the discharge vessel for generating an arc discharge a wall forming the discharge space disposed between the electrodes, the wall having substantially circular cross-section with an inner diameter (d1) and a wall thickness (w1), and*

*an outer bulb surrounding the discharge vessel and disposed at a distance (d2) from a central position of an outer surface of the discharge vessel between the electrodes, the outer bulb being sealed and containing a gas filling having a predetermined thermal conductivity (λ) at 800° C., wherein*

*the wall thickness (w1) ranges from about 1.4 mm to about 2 mm,*

*the distance (d2) ranges from about 0.1 mm to about 1.4 mm, and*

*a heat transition coefficient (λ/d2) calculated as said thermal conductivity (λ) divided by said distance (d2) ranges from about 10 W/(m2K) to about 100 W/(m2K).*

*11. Lamp according to claim 10, wherein said inner diameter (d1) ranges from about 2 mm to about 2.7 mm.*

*12. Lamp according to claim 10, wherein the gas filing consists essentially of Xe, Ar, N2, or O2.*

*13. Lamp according to claim 10, wherein the gas filling has a pressure of 10 mbar to 1 bar.*

*14. Lamp according to claim 10, wherein the gas filling has a lower thermal conductivity at 800° C. than air.*

*15. Lamp according to claim 10, wherein the wall thickness (w1) ranges from about 1.55 mm to about 1.85 mm.*

*16. Lamp according to claim 10, wherein said lamp has a nominal power from about 20 W to about 30 W.*

*17. Lamp according to claim 10, wherein said discharge vessel is made of quartz glass.*

*18. Lamp according to claim 10, wherein said outer bulb is made of quartz glass.*

*19. A high intensity discharge lamp, comprising:*

*a discharge vessel defining a discharge space being essentially free of mercury and containing at least a metal halide and a rare gas;*

*two electrodes disposed within the discharge vessel for generating an arc discharge a wall forming the discharge space disposed between the electrodes, the wall having substantially circular cross-section with an inner diameter (d1) and a wall thickness (w1), and*

*an outer bulb surrounding the discharge vessel and disposed at a distance (d2) from a central position of an outer surface of the discharge vessel between the electrodes, the outer bulb being sealed and containing a gas filling having a predetermined thermal conductivity (λ) at 800° C., wherein*

*the wall thickness (w1) ranges from about 1.4 mm to about 2 mm,*

*the distance (d2) is selected so that a heat transition coefficient (λ/d2) calculated as said thermal conductivity (λ) divided by said distance (d2) ranges from about 10 W/(m2K) to about 100 W/(m2K).*

*20. Lamp according to claim 19, wherein said inner diameter (d1) ranges from about 2 mm to about 2.7 mm.*

*21. Lamp according to claim 19, wherein the gas filing consists essentially of Xe, Ar, N2, or O2.*

*22. Lamp according to claim 19, wherein the gas filling has a pressure of 10 mbar to 1 bar.*

*23. Lamp according to claim 19, wherein the gas filling has a lower thermal conductivity at 800° C. than air.*

*24. Lamp according to claim 19, wherein the wall thickness (w1) ranges from about 1.55 mm to about 1.85 mm.*

*25. Lamp according to claim 19, wherein said lamp has a nominal power from about 20 W to about 30 W.*

*26. Lamp according to claim 19, wherein said discharge vessel is made of quartz glass.*

*27. Lamp according to claim 19, wherein said outer bulb is made of quartz glass.*

*28. A high intensity discharge lamp, comprising:*

*a discharge vessel defining a discharge space being essentially free of mercury and containing at least a metal halide and a rare gas;*

*two electrodes disposed within the discharge vessel for generating an arc discharge a wall forming the discharge space disposed between the electrodes, the wall having substantially circular cross-section with an inner diameter (d1) and a wall thickness (w1), and*

*an outer bulb surrounding the discharge vessel and disposed at a distance (d2) from a central position of an*

*outer surface of the discharge vessel between the electrodes, the outer bulb being sealed and containing a gas filling having a predetermined thermal conductivity (λ) at 800° C., wherein*

*the wall thickness (w1) and the distance (d2) are selected so that a heat transition coefficient (λ/d2) calculated as said thermal conductivity (λ) divided by said distance (d2) ranges from about 10 W/(m2K) to about 100 W/(m2K).*

*29. Lamp according to claim 28, wherein said inner diameter (d1) ranges from about 2 mm to about 2.7 mm.*

*30. Lamp according to claim 28, wherein the gas filing consists essentially of Xe, Ar, N2, or O2.*

*31. Lamp according to claim 28, wherein the gas filling has a pressure of 10 mbar to 1 bar.*

*32. Lamp according to claim 28, wherein the gas filling has a lower thermal conductivity at 800° C. than air.*

*33. Lamp according to claim 28, wherein the wall thickness (w1) ranges from about 1.55 mm to about 1.85 mm.*

*34. Lamp according to claim 28, wherein the distance (d2) ranges from about 0.1 mm to about 1.4 mm.*

*35. Lamp according to claim 28, wherein said lamp has a nominal power from about 20 W to about 30 W.*

*36. Lamp according to claim 28, wherein said discharge vessel is made of quartz glass.*

*37. Lamp according to claim 28, wherein said outer bulb is made of quartz glass.*

* * * * *